(12) United States Patent
Malik et al.

(10) Patent No.: US 8,111,918 B2
(45) Date of Patent: Feb. 7, 2012

(54) SEGMENTATION FOR THREE-LAYER MIXED RASTER CONTENT IMAGES

(75) Inventors: Amal Z. Malik, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 743 days.

(21) Appl. No.: 12/254,432

(22) Filed: Oct. 20, 2008

(65) Prior Publication Data

US 2010/0098351 A1 Apr. 22, 2010

(51) Int. Cl.
*G06K 9/34* (2006.01)
(52) U.S. Cl. .......................... 382/173; 382/199; 382/270
(58) Field of Classification Search ................... 382/177
See application file for complete search history.

(56) References Cited

U.S. PATENT DOCUMENTS

| | | | |
|---|---|---|---|
| 5,017,963 A | 5/1991 | Tuhro | |
| 5,134,667 A * | 7/1992 | Suzuki | 382/164 |
| 5,282,061 A | 1/1994 | Farrell | |
| 5,311,328 A * | 5/1994 | Murata | 358/447 |
| 5,331,442 A * | 7/1994 | Sorimachi | 358/532 |
| 5,369,714 A * | 11/1994 | Withgott et al. | 382/177 |
| 5,583,659 A * | 12/1996 | Lee et al. | 358/3.13 |
| 5,729,360 A * | 3/1998 | Kita et al. | 358/500 |
| 6,043,900 A | 3/2000 | Feng et al. | |
| 6,178,260 B1 * | 1/2001 | Li et al. | 382/173 |
| 6,198,845 B1 | 3/2001 | Tse et al. | |
| 6,272,240 B1 * | 8/2001 | Li et al. | 382/173 |
| 6,343,146 B1 * | 1/2002 | Tsuruoka et al. | 382/163 |
| 6,389,164 B2 * | 5/2002 | Li et al. | 382/176 |
| 6,529,629 B2 * | 3/2003 | Li et al. | 382/176 |
| 6,674,899 B2 | 1/2004 | Nagarajan et al. | |
| 6,859,204 B2 * | 2/2005 | Curry et al. | 345/426 |
| 6,987,882 B2 * | 1/2006 | Curry et al. | 382/173 |
| 7,058,222 B2 | 6/2006 | Li et al. | |
| 7,227,988 B2 * | 6/2007 | Curry et al. | 382/166 |
| 7,236,641 B2 | 6/2007 | Curry et al. | |
| 7,242,802 B2 * | 7/2007 | Curry et al. | 382/173 |
| 7,308,136 B2 * | 12/2007 | Curry et al. | 382/164 |
| 7,324,120 B2 * | 1/2008 | Curry et al. | 345/611 |
| 7,356,183 B2 * | 4/2008 | Curry et al. | 382/173 |
| 7,375,856 B2 | 5/2008 | Curry et al. | |
| 7,376,272 B2 | 5/2008 | Fan et al. | |
| 7,379,587 B2 * | 5/2008 | Curry et al. | 382/164 |
| 7,403,661 B2 * | 7/2008 | Curry et al. | 382/232 |
| 7,456,982 B2 * | 11/2008 | Curry et al. | 358/1.13 |
| 2003/0021447 A1 * | 1/2003 | Ott et al. | 382/112 |
| 2004/0001625 A1 * | 1/2004 | Curry et al. | 382/173 |
| 2004/0001648 A1 * | 1/2004 | Curry et al. | 382/302 |
| 2004/0042687 A1 * | 3/2004 | Curry et al. | 382/302 |
| 2004/0052416 A1 * | 3/2004 | Curry et al. | 382/173 |
| 2004/0052419 A1 * | 3/2004 | Curry et al. | 382/232 |

(Continued)

*Primary Examiner* — Sath V Perungavoor
(74) *Attorney, Agent, or Firm* — Pillsbury Winthrop Shaw Pittman LLP

(57) ABSTRACT

A method for improving image quality of edge pixels, when separating an image signal into a set of image planes is provided. The method includes searching for a minimum value and a maximum value within at least one predefined neighborhood pixel window centered on a current pixel in the image signal; and conditionally switching the edge pixels to either the minimum value or the maximum value in the foreground and background planes respectively, or to a value of a specified characteristic of the current pixel, based on predetermined criteria. One such predetermined criteria for this conditional switching of the edge pixels comprises comparing the minimum or maximum luminance values in the predefined neighborhood window of the current pixel and their corresponding chrominance values to some predetermined thresholds which are characteristic of the image for the foreground and background planes, respectively.

22 Claims, 14 Drawing Sheets

U.S. PATENT DOCUMENTS

| | | | |
|---|---|---|---|
| 2004/0052421 A1* | 3/2004 | Curry et al. | 382/243 |
| 2004/0052427 A1* | 3/2004 | Curry et al. | 382/256 |
| 2004/0096122 A1* | 5/2004 | Curry et al. | 382/302 |
| 2005/0036694 A1 | 2/2005 | Li et al. | |
| 2005/0180628 A1* | 8/2005 | Curry et al. | 382/164 |
| 2005/0180642 A1* | 8/2005 | Curry et al. | 382/232 |
| 2007/0147684 A1 | 6/2007 | Loce et al. | |
| 2007/0253620 A1 | 11/2007 | Nagarajan et al. | |
| 2007/0280551 A1 | 12/2007 | Oztan et al. | |
| 2010/0098351 A1* | 4/2010 | Malik et al. | 382/266 |
| 2011/0085735 A1* | 4/2011 | Malik | 382/199 |
| 2011/0158529 A1* | 6/2011 | Malik | 382/173 |

* cited by examiner

SEGMENTATION FOR THREE-LAYER MIXED RASTER CONTENT IMAGES

BACKGROUND

1. Field

The present disclosure relates generally to a method and a system for improving image quality of edge pixels, when separating an image signal into a set of image planes.

2. Description of Related Art

Scanning and exporting color images to a network has started to become one of the standard features offered by digital multifunction devices. File size of a color image is an important factor while exporting color images. In addition to offering different resolutions, different compression schemes are being offered to reduce the file size of the color image that needs to be exported. One of the popular compression/file formats that are currently being offered is. Mixed or Multiple Raster Content (MRC) representation.

The MRC representation of documents is versatile. It provides the ability to represent color images and either color or monochrome text. The MRC representation enables the use of multiple "planes" for the purpose of representing the content of documents. The MRC representation is becoming increasingly important in the marketplace. It has been already established as the main color-fax standard. It is also offered as a selection in the Scan-to-Export feature, for example, in digital multifunction devices.

In a MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 bit per pixel) in one of the planes, called the Selector plane. The selector plane may have only one bit per pixel that controls the selection from either foreground or background. Following a careful separation, the various planes could be independently compressed using standard compression schemes (such as JPEG and G4) with good compression and high quality at the same time.

In digital image processing, an edge within an image is referred to a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

FIGS. 13 and 14 show a digital image (e.g., a bar chart) and an edge profile that is created from the digital image, respectively. As shown in FIG. 14, the black areas in the edge profile represent the edges within the digital image. The edge pixels are the pixels that occur at and about the edges (e.g., the dark lines are intended to represent strong edges while the broken lines represent edges with lesser intensity in the edge profile as shown in FIG. 14) in the image.

A three layer segmentor used for MRC representation pushes the edges in foreground and background planes to minimum and maximum values of the current pixel, respectively. In other words, the edge pixels in the foreground, and the background planes are switched to the minimum value or the maximum value, respectively, which adds contrast to the image and provides some background suppression. The minimum and maximum values of each pixel are evaluated based on the local neighborhood of the current pixel. These minimum and maximum values are sometimes very different from the current pixel value, which may cause ringing artifacts around edges and make them appear artificial, resulting in poor image quality.

U.S. Pat. No. 7,242,802, which is incorporated by reference herein in its entirety, describes a prior approach for separating an image signal into a set of image signals. The invention of U.S. Pat. No. 7,242,802 discloses that the output of the foreground values will be correspondingly weighted between the current input signal value and the minimum value of the dependent min-max module based on the amount of segmentation enhancement. Similarly, the output of the background values will vary between the current input signal value and the maximum value of the dependent min-max module in proportion to the amount of segmentation enhancement.

Thus, there is a need for a method and a system for efficiently separating an image into a set of planes, such that the advantages of the MRC representation can be fully exploited. The present disclosure proposes a method and a system to conditionally switch foreground and background edge pixels to either minimum value or maximum value, respectively, or to the current pixel values.

SUMMARY

According to one aspect of the present disclosure, a method for improving image quality of edge pixels in a background plane, when separating an image signal into a set of image planes is provided. The method includes searching, via a mm-max module, for a minimum value and a maximum value of a specified characteristic within at least one predefined neighborhood pixel window centered on a current pixel in the image signal, wherein the predefined neighborhood pixel window comprises the edge pixels; and conditionally switching, via a dynamic threshold module, the edge pixels to either the respective minimum value of the specified characteristic or the maximum value of the specified characteristic received from the min-max module, or to a value of the specified characteristic of the current pixel, based on a predetermined criteria. The predetermined criteria for conditionally switching the edge pixels comprises determining whether a maximum luminance value in the predefined neighborhood pixel window is greater than or equal to a predetermined threshold.

According to another aspect of the present disclosure, a method for improving image quality of edge pixels in a foreground plane, when separating an image signal into a set of image planes is provided. The method includes searching, via a min-max module, for a minimum value and a maximum value of a specified characteristic within at least one predefined neighborhood pixel window centered on a current pixel in the image signal, wherein the predefined neighborhood pixel window comprises the edge pixels; and conditionally switching, via a dynamic threshold module, the edge pixels to either the respective minimum value of the specified characteristic or the maximum value of the specified characteristic received from the min-max module, or to a value of the specified characteristic of the current pixel, based on a predetermined criteria. The predetermined criteria for conditionally switching the edge pixels comprises determining whether a) a minimum luminance value in the predefined neighborhood pixel window is less than or equal to a predetermined threshold; and b) a luminance value of the current pixel is less than or equal to a predetermined threshold.

According to another aspect of the present disclosure, a system for improving image quality of edge pixels in a background plane, when separating an image signal into a set of image planes is provided. The system includes a min-max module, and a dynamic threshold module. The min-max module is configured to search for a minimum value and a maximum value of a specified characteristic within at least one predefined neighborhood pixel window centered on a current pixel in the image signal. The predefined neighborhood pixel window comprises the edge pixels. The dynamic threshold module is configured to conditionally switch, based on a predetermined criteria, the edge pixels to either the respective minimum value of the specified characteristic or the maximum value of the specified characteristic received from the min-max module, or to a value of the specified characteristic of the current pixel. The predetermined criteria for conditionally switching the edge pixels comprises determining whether a maximum luminance value in the predefined neighborhood pixel window is greater than or equal to a predetermined threshold.

According to another aspect of the present disclosure, a system for improving image quality of edge pixels in a foreground plane, when separating an image signal into a set of image planes is provided. The system includes a min-max module, and a dynamic threshold module. The min-max module is configured to search for a minimum value and a maximum value of a specified characteristic within at least one predefined neighborhood pixel window centered on a current pixel in the image signal. The predefined neighborhood pixel window comprises the edge pixels. The dynamic threshold module is configured to conditionally switch, based on a predetermined criteria, the edge pixels to either the respective minimum value of the specified characteristic or the maximum value of the specified characteristic received from the min-max module, or to a value of the specified characteristic of the current pixel. The predetermined criteria for conditionally switching the edge pixels in a background plane further comprising determining whether a) a maximum luminance value in the predefined neighborhood pixel window is greater than or equal to a predetermined threshold; and b) a luminance value of the current pixel is greater than or equal to a predetermined threshold.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The image signal represents a digitally scanned document. The image planes are suitable for a Mixed Raster Content (MRC) representation of the digitally scanned document. In one embodiment, the MRC representation includes three layers or planes: Foreground FG, Background BG, and Mask. In such embodiment, both the Foreground FG and Background BG are multi-level and the Mask is bi-level.

Figure 1:
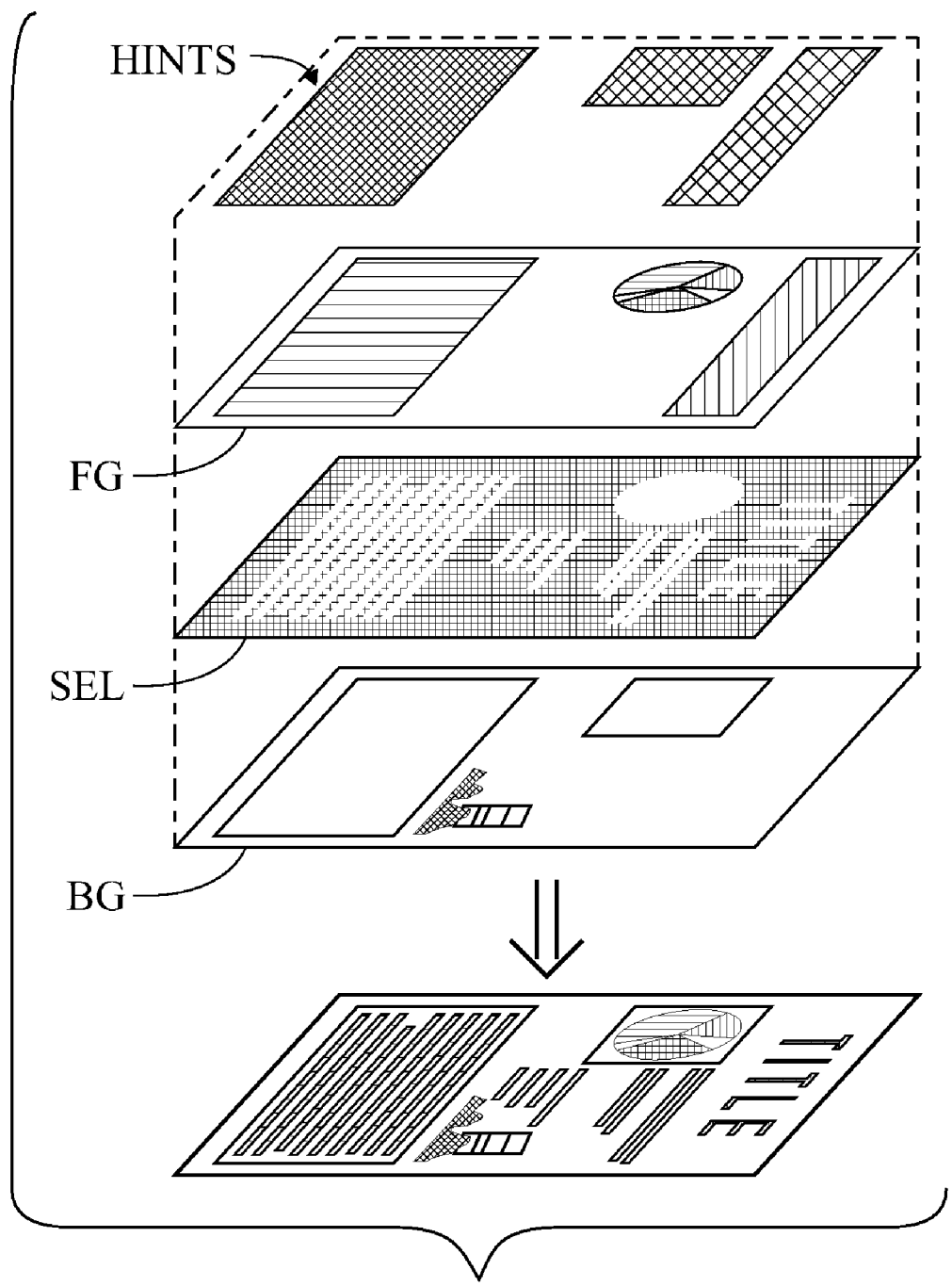
FIG. 1 illustrates the MRC structure for documents.

FIG. 1 shows another MRC representation. The representation comprises up to four independent planes: Foreground FG, Background BG, Selector SEL, and Rendering Hints HINTS. In the most general case, there could be multiple Foreground and Selector pairs at higher levels. However, in most applications, the representation is limited to three or four planes. The Background plane is typically used for storing continuous-tone (i.e., contone) information, such as pictures and/or smoothly varying background colors. The Selector plane normally holds the image of text (binary) as well as other edge information (e.g., line art drawings). The Foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the Rendering Hints plane, which is used for communicating additional information about the content of the document. For example, the Rendering Hints plane may carry the ICC (International Color Consortium) color hints that identify the best color matching strategy for the various objects on the page.

Computers and other electronic equipment typically depict color in 3-D coordinates such as RGB. Many image printing systems, on the other hand, print in either three-dimensional colorant space, cyan, magenta, yellow (CMY) or four-dimensional colorant space, cyan, magenta, yellow, and black (CMYK) which can be derived from the input values, e.g., RGB. Frequently, a device independent color space is used as an intermediate representation of the image. A common choice for such a device independent space is a luminance-chrominance space, denoted generically as $LC_1C_2$. The L component represents luminance or lightness, and $C_1$ and $C_2$ are the two chrominance coordinates representing red-green and yellow-blue variations, respectively. An example of a luminance-chrominance representation is L*a*b*, or YCbCr, etc. Translations are then derived from input RGB to $LC_1C_2$, and from $LC_1C_2$ to image printing system colorant space. In other words, if the image is in an RGB space, it is typically first converted to such a luminance-chrominance representation for simplicity of edge calculation. The particular luminance-chrominance representation used is not limiting, and any representation may be used.

The Foreground and Background planes are defined to be two full-color, such as L*a*b* or YCbCr. The Selector plane is defined as a binary (1-bit deep) plane. One exemplary MRC representation specifies that the Foreground and Background are to be JPEG compressed, and that the Selector plane is to be ITU-G4 compressed (standard Group 4 facsimile compression). The Rendering Hints plane is considered to be optional, but if one is used, a compression scheme similar to the Lempel-Zev-Welch scheme may be used for its compression. In general, the Foreground, Background, Selector and Rendering Hints planes can all be at different resolutions, and they are not required to maintain the original source input resolution.

The method for assembling back a "segmented" MRC image from its components (i.e., planes) is by "pouring" the Foreground colors through the Selector plane "mask" on top of the Background plane, thus overwriting the previous content of the Background plane at these locations. In other words, the assembly is achieved by multiplexing between the Foreground and Background information on a pixel-by-pixel basis, based on the binary control signal of the Selector plane. For example, if the Selector value is 1, the content of Foreground is used; otherwise (i.e., for Selector value=0) the content of Background is used. The multiplexing operation is repeated on a pixel-by-pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 Selector sample per source pixel) in the Selector plane. Following a careful separation, the various planes could be independently compressed using standard compression schemes (such as JPEG and G4) with good compression and high quality at the same time.

The Segment Module takes in a full color input image to be segmented and produces three separate outputs for the three MRC planes: the Foreground FGD, Background BGD, and Selector Sel planes, as well as several additional signals. The segment module is described in detail in U.S. Pat. No. 7,242,802, herein incorporated by reference in its entirety.

Figure 2:
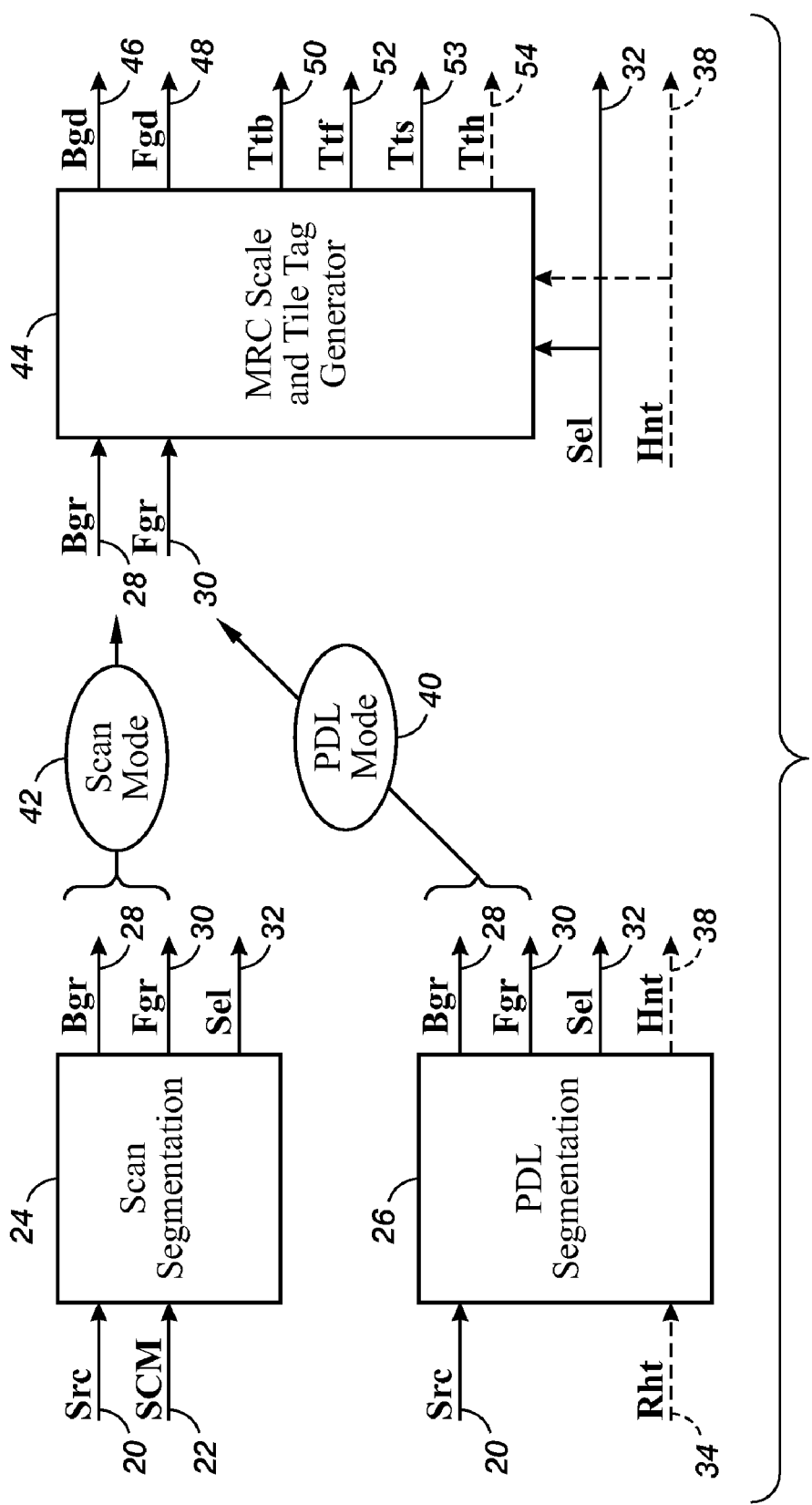
FIG. 2 is a block diagram of the Segment Module.

A block diagram of the Segment Module is shown in FIG. 2. The Segment Module is composed of two stages: a Segmentation stage 24, followed by an MRC Scale and Tile Tag Generation stage 44. The Segmentation stage 24 can operate in one of two mutually exclusive modes: Scan Segmentation 24 or PDL Segmentation 26.

The primary input to the Scan Segmentation Module 24 is Src 20. It also utilizes an 8-bit screen magnitude estimate signal SCM 22, which is further detailed in U.S. Pat. No. 7,375,856, which is incorporated by reference herein in its entirety. The Scan Segmentation Module 24 outputs the full-color (raw) Foreground and Background planes Fgr 30 and Bgr 28, and (possibly super sampled) Sel 32, which is exported by the module 24.

In PDL mode 40, the PDL Segmentation Module 26 does not use SCM 22, but instead may use the signal Rht 34, which captures hint information from the PDL interpreter and will be encoded into a CEF Hint plane Hnt 38. The output from the PDL Segmentation Module 26 includes the full-color (raw) Foreground and Background planes. Fgr 30 and Bgr 28, the binary Selector plane Sel 32, and possibly the Hint plane Hnt 38 when hints are present. As indicated above, the Hint plane can be 1-bit or 8-bit deep.

The Src 20 image for Scan mode 42, and PDL mode 40 typically have been processed differently. The Scan Segment Module 24 relies on the input being de-screened. This is not required for the clean, noise free images directly generated from PDL sources.

For Scan processing, the chroma components of the source input image Src 20, are assumed to be sub-sampled by a factor of 2 in the fast scan (x) direction (XCSS). None of the color images produced by the segmentor will use XCSS. When the chroma samples of the source image are accessed, no 'adjustment' filtering is required. That is for the 4 sample XCSS quad: $L_0A_0L_1B_1$; pixel 0 is $L_0A_0B_1$ and pixel 1 is $L_1A_0B_1$.

The Selector plane Sel output is binary (1 bit deep), and the packed Selector plane Spk packs together 2×2 binary neighboring Selector pixels (4 bits).

For PDL processing, the source input Src 20 is assumed to be a full-color image where the chroma channels are typically not sub-sampled, and therefore are at the same resolution as the luminance channel.

In general, the exported Foreground, Background, and Selector planes could all be at different resolutions relative to the input image. For example, the Foreground and Background planes are typically down-sampled while the Selector plane may be up-sampled from the original input resolution. The amount of up or down sampling is programmable under software control.

The MRC Scale and Tile Tag Generation Module 44 reads in the initial (raw) Background Bgr 28, Foreground Fgr 30, Selector Sel 32, and the optional Hints Hnt 38 if any exist (PDL mode only). It produces the final color MRC layers: Background Bgd 46 and Foreground Fgd 48, by subsampling and filling in the 'holes' or previously unassigned pixels in the raw images. In addition, the MRC Scale and Tile Tag Generation Module 44 generate four associated Tile Tag signals for the Background Ttb 50, Foreground Ttf 52, Selector Tts 53, and optional Rendering Hints Tth 54 if any exist (PDL mode only). The Tile Tag is one binary bit per tile (or strip) indicating whether the current tile may be altogether omitted. This further reduces the overall file size. Missing tiles are automatically filled to pre-defined default color for each plane.

The Scan Segmentation Module 24 is responsible for performing the MRC segmentation into three planes in the case of scanned documents. The inputs to the Scan Segmentation Module include the input color signal Src 20 and the 8-bit screen magnitude estimate signal SCM 22. The Scan Segmentation Module 24 outputs the full-color (raw) Foreground and Background planes Fgr 28 and Bgr 30, and the Selector Sel 32 plane.

Figure 3:
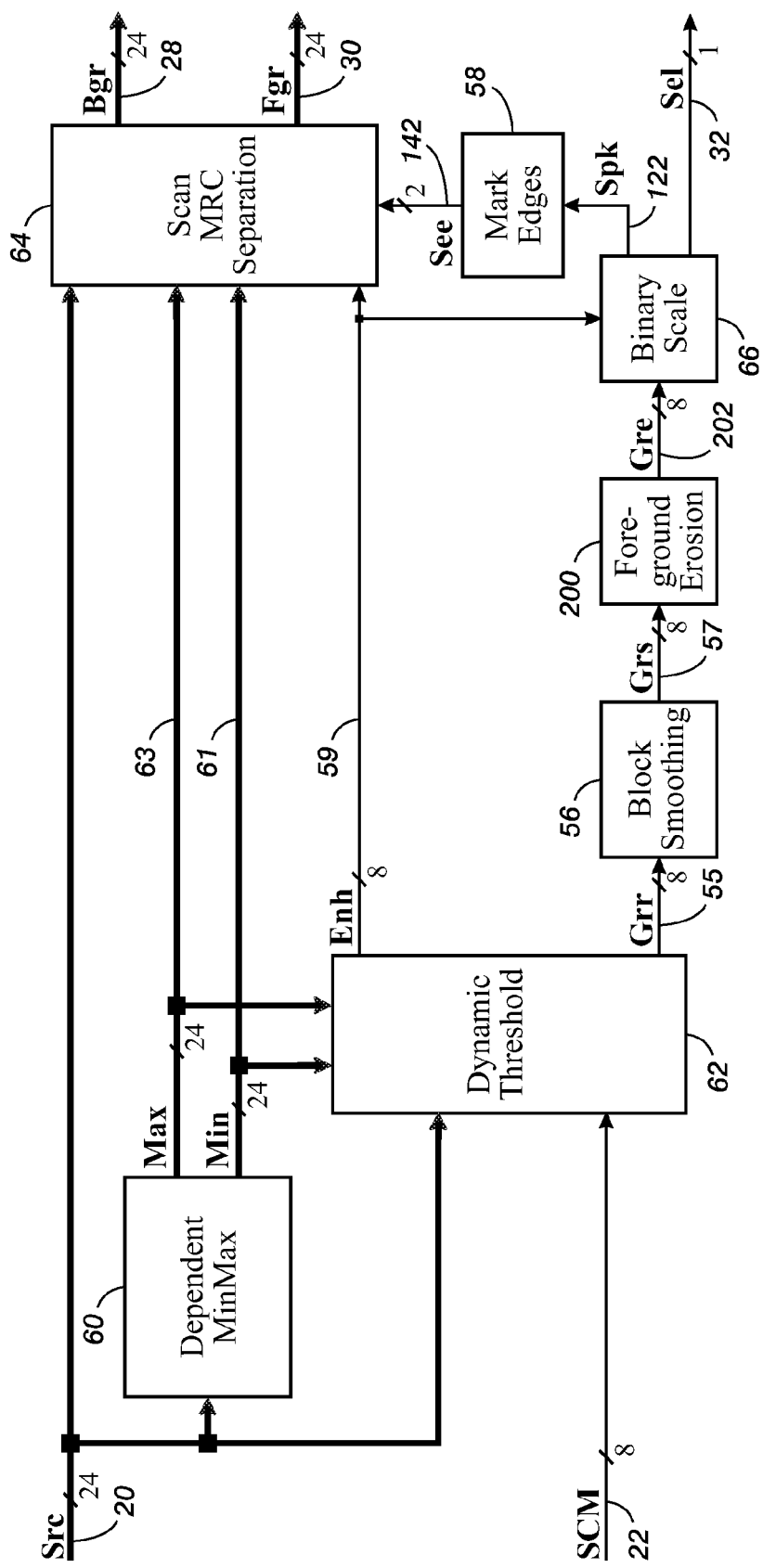
FIG. 3 is a block diagram of the Scan Segment Module.

The block diagram of the Scan Segmentation Module 24 is shown in FIG. 3. The following is a brief description of the various modules comprising the Scan Segmentation Module 24. The color input signal Src 20 is forwarded to the Dependent Min-Max Module 60, which searches in a 8×8 window centered on the current pixel of interest for the minimum Min and maximum Max color values for dynamic thresholding.

The minimum Min 61 and maximum Max 63 values are forwarded to the Dynamic Threshold Module 62 and the Scan MRC Separation Module 64. The Dynamic Threshold Module 62 also uses the input color image Src 20 and the 8-bit Screen Magnitude estimate signal SCM 22. A Dynamic Threshold Module 62 outputs the monochrome 8-bit signal Grr 55, the biased zero crossings of which represent the locations of edges in the Selector planes. In addition, the Dynamic Threshold Module 62 also generates an 8-bit segmentation enhancement control Enh 59, which is used to communicate to the Scan MRC Separation Module 64, on a pixel-by-pixel basis, if segmentation is to be applied, and if so, how much additional enhancement to apply.

The purpose of the Block Smoothing Unit 56 is to move weak (a.k.a. false) edges away from strong edges to prevent high contrast transitions within the Foreground and Background JPEG minimum coded unit (MCU) blocks. If there are no strong edges nearby, the weak edges are pushed out of the JPEG block to the boundary between neighboring blocks. This process eliminates unnecessary sharp transitions within JPEG blocks, thereby increasing the overall compression and quality. The output from the Block Smoothing Unit 56 is an 8-bit smoothed Grs 57 signal, which represents a smoothed (filtered) version of the incoming signal Grr 55.

The Foreground Erosion Unit 200 is used to meet thin (but unbroken) text requirements using linear YCC segmentation. A fixed value is subtracted from the gray selector, thereby thinning/eroding the foreground. This is only done if a neighborhood test verifies that the thinning won't result in broken lines. The output is a smoothed Gre 202 signal or the Grs 57 signal.

The Binary Scale Unit 66 provides the capability to super-sample the resulting smoothed gray selector signal Grs 57 from the Block Smoothing 56 output. In the normal 1:1 mode, the Grs 57 signal is threshold to produce the binary Selector plane output Sel 32. However, for high-quality text and line-art reproduction, the Selector plane may be super-sampled at twice the input resolution (e.g., at 1200 dpi for a 600 dpi input). The super-sampling of the Selector signal is done by doubling the sampling frequency prior to thresholding. The resulting binary Selector pixels at the higher resolution are packed, four neighborhoods at a time, into the packed Selector signal Spk 122.

The Mark Edge Processing Module 58 takes in the packed high resolution Selector output Spk 122 and counts the number of on and off pixels in a 5×5 [high-resolution] window centered on the current [low-resolution] pixel of interest. The output from the Mark Edge Processing Module 58 is the two-bit signal See 142. The See signal 142 is set to 0 if all of the input pixels inside the 5×5 window are off (corresponding to a 3×3 constant background area). Similarly, the See signal 142 is set to 3 if all of the input pixels inside the window are on (corresponding to a 3×3 constant foreground area). In addition, the See output is set to 1 or 2 if the 5×5 window is mostly background or mostly foreground, respectively.

Finally, the Scan MRC Separation Module 64 takes in the full color source signal Src 20 to be segmented as well as the color minimum and maximum (Min, Max) from the Dependent Min-Max Module 60. In addition, the MRC Separation Module 24 uses the See signal 142 from the Mark Edge Processing Module 58, and the segmentation and enhancement signal Enh 59 from the Dynamic Threshold Module 62. The MRC Separation Module 64 actually produces the two full-color outputs Fgr 24 and Bgr 30 as the rough estimates of the Foreground and Background planes, respectively.

Figure 4:
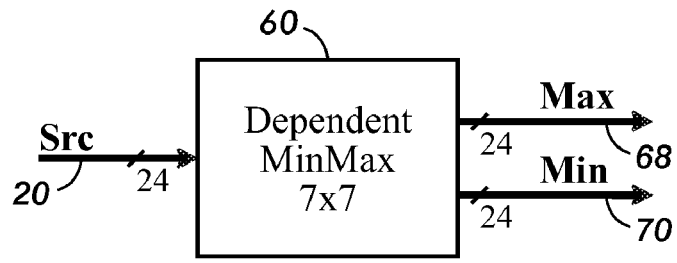
FIG. 4 is a block diagram of the Dependent Min-Max Module.

A block diagram of the Dependent Min-Max Module is shown in FIG. 4. The Dependent Min-Max Module 60 inputs the Src signal 20 and examines an 8×8 window centered on the pixel of interest 80 to find the max L and min L pixels, L being the luminance channel. The Max output 68 is the pixel that has the max L 72. The Min output 70 is the pixel that has the min L 74. The resulting chroma values are therefore dependent on the locations of where the extreme luminance values were found.

Figure 5:
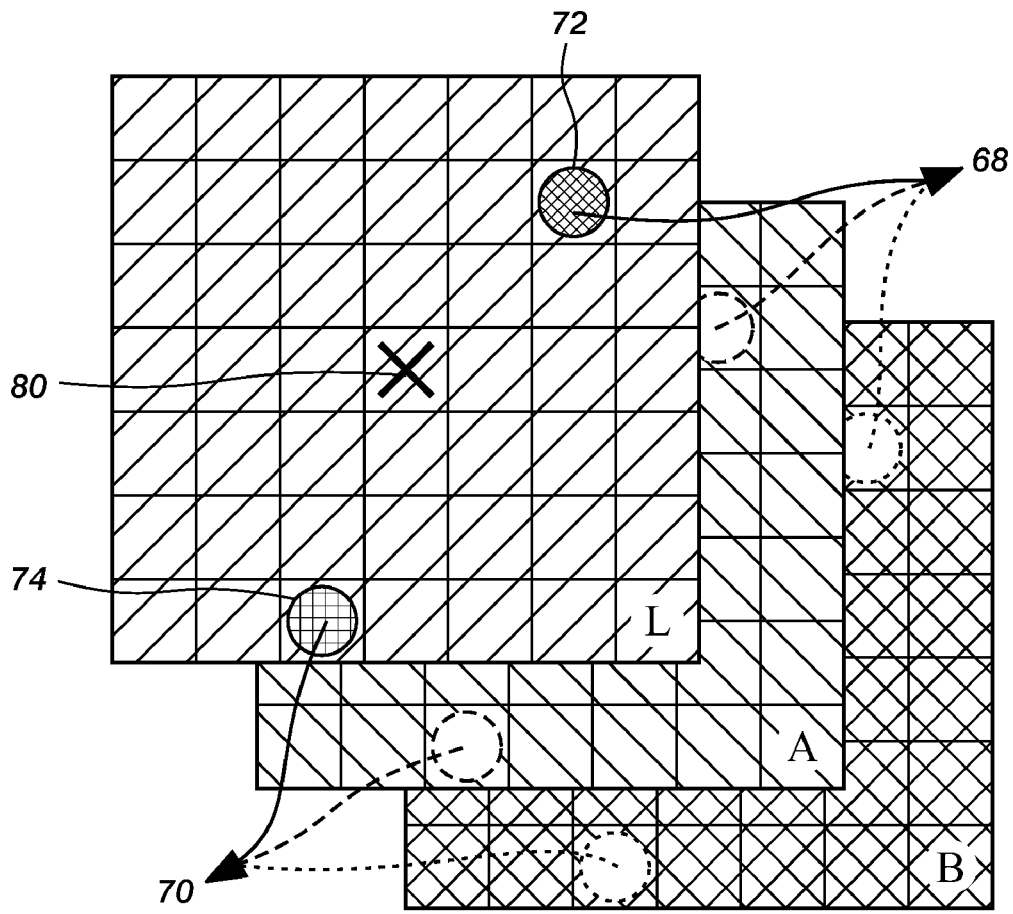
FIG. 5 illustrates the operation of the Dependent Min-Max Module.

The operation of the Dependent Min-Max Module 60 is illustrated in FIG. 5. The operation proceeds in two steps. In the first step, the Dependent Min-Max Module 60 searches across the window for the largest 68 and smallest 70 samples of the luminance component L. In other words, the minimum and maximum for each pixel based on an 8×8 neighborhood around that pixel is calculated. It uses a sliding window technique to do so. Once the locations of the minimum 74 and maximum luminance 72 values are found, they are output along with the chroma components (A, B) at these locations. Even though the Src signal 20 arrives at this module with X subsampled chroma components, this is the point at which the X chroma subsampling ceases. That is, the Max and Min color signals do not have X sub-sampled chrominance.

This filtering operation is separable. For instance the Min/Max of individual columns can be computed first, and then the final Min 74 can be computed by finding the column Min pixel that has the minimum L. This means that the incremental work required as the window in stepped across the Src image amounts to computing one 8 high column and one 8 wide row for both the Min and the Max outputs.

The Dynamic Threshold Module 62 applies adaptive thresholding to the incoming color source signal Src 20 to generate a raw signed 8-bit gray selector signal Grr output 55, whose zero crossings represent the transitions of the Selector plane. Gray selector values>=0 mark pixels which will have selector values of 1 and be placed in the foreground. Gray selector values<0 mark pixels which will be placed in the background. The Dynamic Threshold Module 60 utilizes the pair of dependent min/max values (Min, Max) 61 and 63 respectively from the Dependent Min-Max Module 60, as well as the 8-bit screen magnitude estimate signal Scm 22 from the Screen Estimation Module (SEM). The Dynamic Threshold Module 62 also produces the 8-bit signal Enh 59. The Enh signal 59 is communicated to the Scan MRC Separation Module 64 to determine how much enhancement to apply as pixels are placed in the background and/or foreground planes.

The Dynamic Threshold Module 62 operates in three segmentation modes: dynamic threshold, static threshold, and force-to-foreground. Static thresholding is applied when the image is smooth (unchanging). Force-to-foreground mode is enabled for halftone images. Strong decisions are only produced in the Dynamic thresholding mode and only Strong decisions may have non-zero Enh codes. Both Static thresholding and force-to-foreground modes only produce Weak decisions. While the strong decisions (e.g., non-zero Enh codes) provide information about the edges, the weak decisions (e.g., zero Enh codes) provide information about non-edge areas of the image. The present disclosure uses the edge information for enhancing the foreground and background planes.

The Dynamic Threshold Module 62 and various other modules of the Scan Segmentation Module are described in further detail in U.S. Pat. No. 7,242,802, which is incorporated by reference herein in its entirety and will now be described in detail here.

As noted above, the minimum and maximum values for each pixel are sometimes very different from the current or the original value of the pixel causing ringing artifacts around the edges in the digital image. These ringing artifacts around the edges in the digital image also makes the digital image look artificial, and resulting in poor image quality of the digital image. Therefore, the present disclosure proposes a method and a system for conditionally switching the foreground and background edge pixels to either minimum or maximum values for the current pixel, respectively or to the original pixel values by using the Dynamic Threshold Module 62 in the three layer segmentor.

The present disclosure provides a method and a system for improving image quality of edge pixels, when separating an image signal into a set of image planes. The method includes searching, via a min-max module, for a minimum value and a maximum value of a specified characteristic within at least one predefined neighborhood pixel window centered on a current pixel in the image signal, and conditionally switching, via a dynamic threshold module, the edge pixels to either the respective minimum value of the specified characteristic or maximum value of the specified characteristic received from the min-max module, or to a value of the specified characteristic of the current pixel, based on a predetermined criteria. The predetermined criteria includes determining whether chrominance values of the current pixel is equal to a neutral value or within a predetermined range including the neutral value. The neutral value is a midpoint of a range of color intensity values. The predefined neighborhood pixel window includes the edge pixels. The specified characteristic within at least one predefined neighborhood pixel window centered on the current pixel is a luminance value of a luminance channel.

Figure 6:
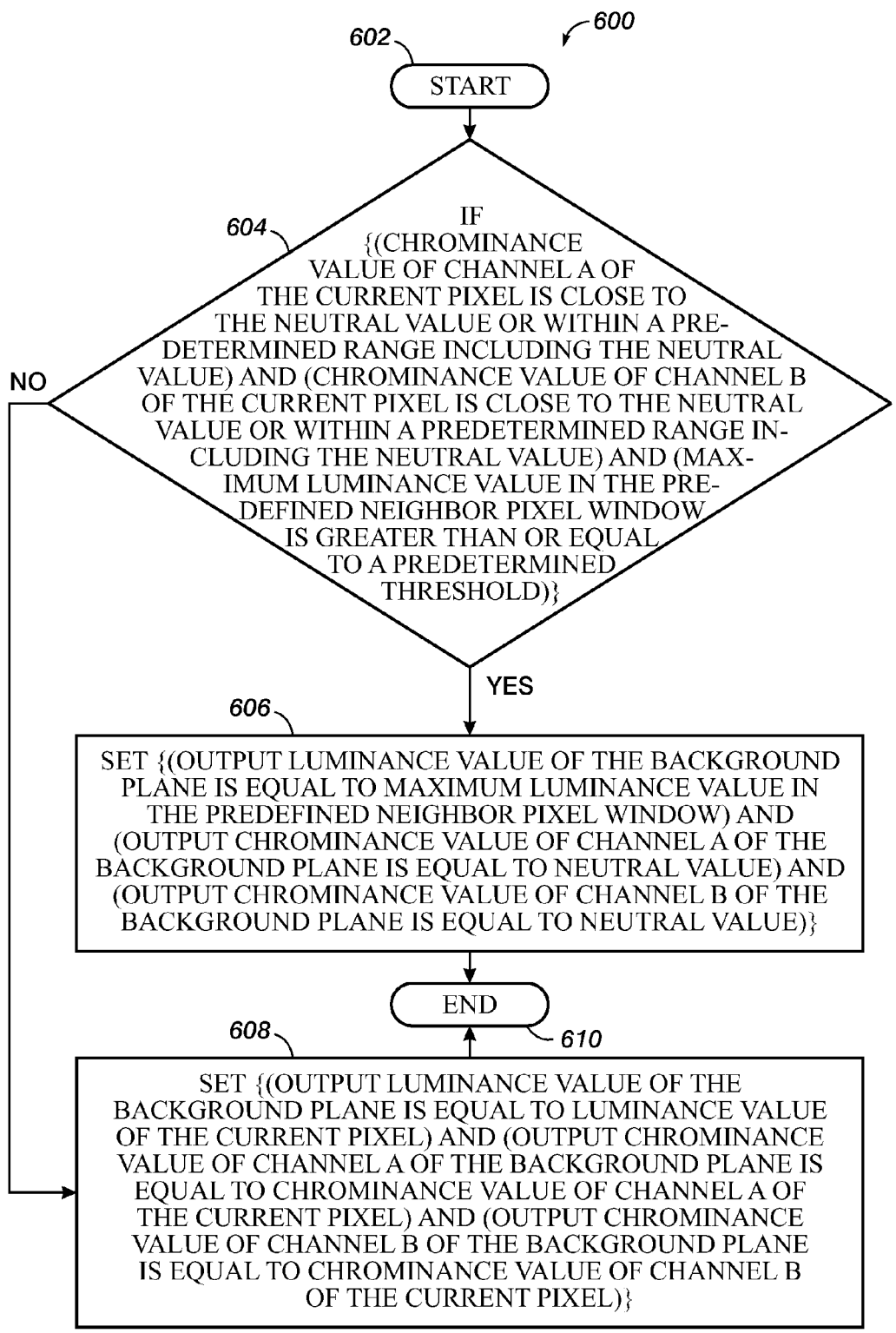
FIG. 6 illustrates a method for adjusting background edge pixels in accordance with an embodiment of the present disclosure.

FIG. 6 illustrates a method 600 for adjusting the background edge pixels in accordance with an embodiment of the present disclosure. The method 600 begins at procedure 602. At procedure 604, a controller determines whether the following conditions are satisfied: a) chrominance value of channel A of the current pixel is close to neutral value or within a predetermined range including the neutral value, b) chrominance value of channel B of the current pixel is close to neutral value or within a predetermined range including the neutral value, and c) maximum luminance value in the predefined neighborhood pixel window is greater than or equal to a predetermined threshold.

A pixel of interest (e.g., current pixel) includes three components, namely, a luminance component that represents luminance or lightness, and two chrominance components that represent red-green and yellow-blue variations, respectively. The two chrominance components (i.e., that represent red-green and yellow-blue variations) correspond to the chrominance value of channel A of the current pixel and the chrominance value of channel B of the current pixel, respectively.

The predefined neighborhood pixel window represents a window centered on a pixel of interest (e.g., current pixel). The predefined neighborhood pixel window may be N×N window, where N is variable. The predefined neighborhood pixel window may be an 8×8 window. Alternatively, the predefined neighborhood pixel window may be a 7×7 window. In one embodiment, the present disclosure proposes use of a smaller predefined neighborhood pixel window in evaluating the minimum and maximum values of the current pixel, thus, reducing the ringing artifacts around the edges.

As noted above, the dependent Min-Max Module 60 determines the maximum luminance value in the predefined neighborhood pixel window. The dependent Min-Max Module 60 examines the predefined neighborhood pixel window centered on the pixel of interest 80 (as shown in FIG. 5) to find the maximum luminance value in the predefined neighborhood pixel window.

In one embodiment, in order to determine whether the chrominance value of channel A of the current pixel is close to neutral value or within a predetermined range including the neutral value, the controller uses the following formula:

$$\text{absolute}(chrom\_a - 128) < NeutralC$$

Where:
chrom_a is a chrominance value of channel A of the current pixel of interest;
128 is a neutral value, wherein the neutral value is a midpoint of a range of color intensity values (e.g., ranging from 0-255); and
NeutralC is a predetermined threshold for the chrominance value of channel A to measure how close the chrominance value of channel A of the current pixel of interest is to the neutral value. The value of NeutralC may range from 5 to 10.

In other words, the controller determines the difference between the chrominance value of channel A of the current pixel and a neutral value (e.g., "128"). The controller then determines the absolute value of the calculated difference. The controller then determines whether the absolute value of the calculated difference is less than a constant, NeutralC, in order, to determine whether the chrominance value of channel A of the current pixel is close to neutral.

In the following detailed description reference is made to image data having a gray value in a range between 0 and 255, wherein a gray level of 0 represents black and a gray level of 255 represents white. However it should be appreciated that any range of gray levels may be used and is not limited to the range of 0 to 255. Additionally, it should be appreciated that the values can be "reversed" such that 0 corresponds to white and 255 corresponds to black. The neutral value is a midpoint of a range of color intensity values (e.g., ranging from 0-255), and is equal to 128.

Similarly, in one embodiment, in order to determine whether the chrominance value of channel B of the current pixel is close to neutral value or within a predetermined range including the neutral value, the controller uses the following formula:

$$\text{absolute}(chrom\_b - 128) < NeutralC$$

Where:
chrom_b is a chrominance value of channel B of the current pixel of interest;
128 is a neutral value, wherein the neutral value is a midpoint of a range of color intensity values (e.g., ranging from 0-255); and
NeutralC is a predetermined threshold for the chrominance value of channel B to measure how close the chrominance value of channel B of the current pixel of interest is to the neutral value. The value of NeutralC may range from 5 to 10.

In other words, the controller determines the difference between the chrominance value of channel B of the current pixel and a neutral value (e.g., "128"). The controller then determines the absolute value of the difference calculated. The controller then determines whether the absolute value of the calculated difference is less than a constant, NeutralC, in order, to determine whether the chrominance value of channel B of the current pixel is close to neutral.

In one embodiment, in order to determine whether the maximum luminance value in the predefined neighborhood pixel window is greater than or equal to a predetermined threshold, the controller uses the following formula:

$$lum\_max >= MaxL1$$

Where:

lum_max is maximum luminance value in the predefined neighborhood pixel window; and MaxL1 is a predetermined threshold of the maximum luminance value to measure how close the maximum luminance value is to the background value of the image for switching luminance to maximum luminance value in the background plane. The value of MaxL1 may be equal to 250.

Next, at procedure 606, the controller assigns a) the maximum luminance value in the predefined neighborhood pixel window to the output luminance value of the background plane, b) a neutral value to the output chrominance value of channel A of the background plane and c) a neutral value to the output chrominance value of channel B of the background plane, if the conditions at procedure 604 are satisfied. As noted above, the neutral value is a midpoint of a range of color intensity values (e.g., ranging from 0-255), and is equal to 128. If not, in procedure 608, the controller assigns a) the luminance value of the current pixel to the output luminance value of the background plane, b) the chrominance value of channel A of the current pixel to the output chrominance value of channel A of the background plane and c) the chrominance value of channel B of the current pixel to the output chrominance value of channel B of the background plane The method 600 ends at procedure 610.

In other words, if the conditions at procedure 604 are satisfied, then the controller suppresses the background around the edges in the digital image. That is, the maximum luminance value in the predefined neighborhood pixel window is assigned to the output luminance value of the background plane. Otherwise, the background is not suppressed around the edges in the digital image. That is, the current pixel retains its original luminance and chrominance values.

The method 600 for adjusting the background edge pixels, at procedure 604, determines whether maximum luminance value in the predefined neighborhood pixel window is greater than or equal to a predetermined threshold, when the maximum luminance value in the predefined neighborhood pixel window is very high (e.g., in order of 250). However, if the maximum luminance value in the predefined neighborhood pixel window is not very high (e.g., in range of 220-240), the method for adjusting the background edge pixels compares the luminance value of the current pixel with a predetermined threshold, and uses this condition in addition to the conditions a, b, and c of procedure 604 of the method 600 to determine whether conditionally switching of the edge pixels in the background plane to either the maximum value of the specified characteristic (e.g., luminance) received from the min-max module or to the value of the current pixel is to be performed.

Figure 7:
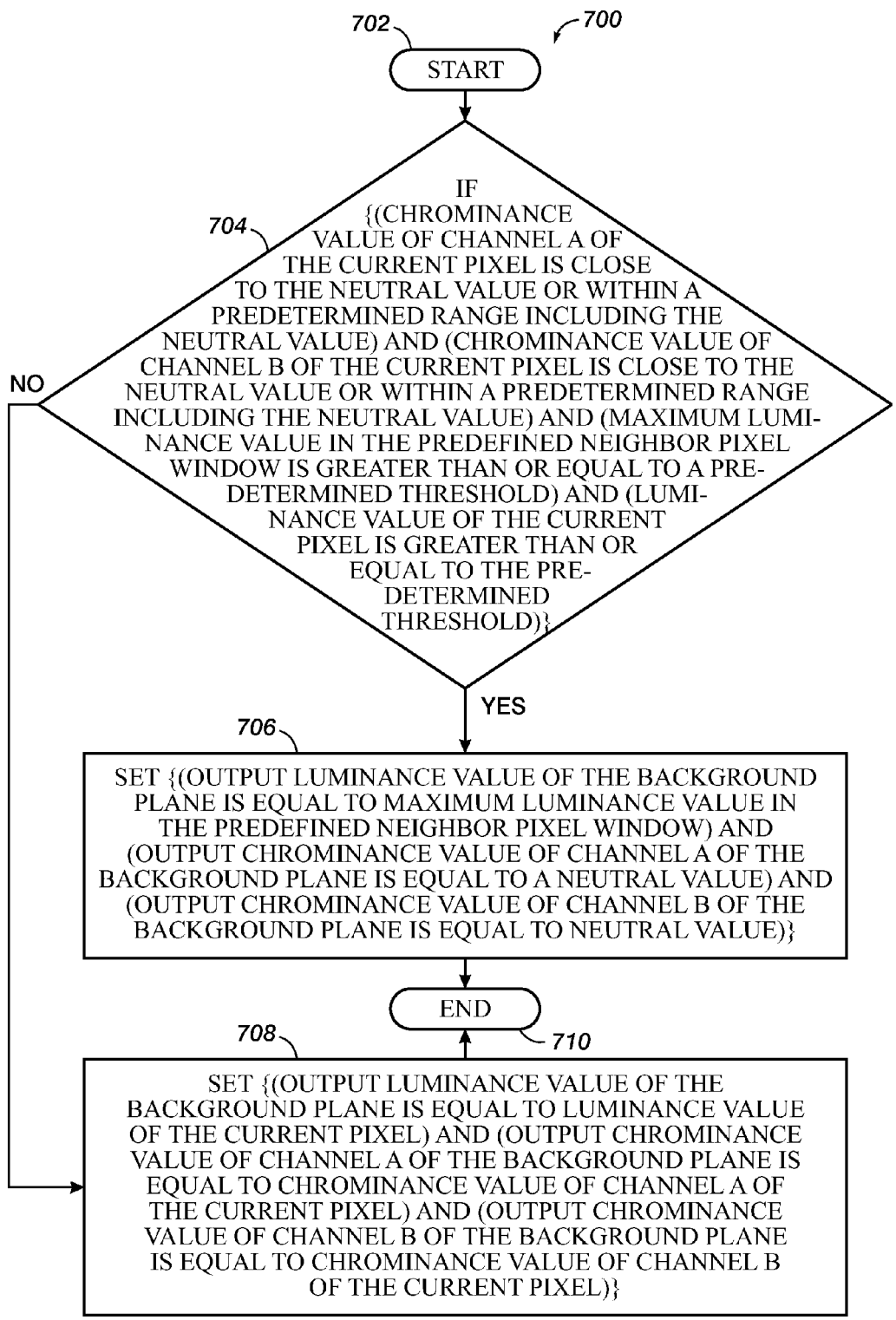
FIG. 7 illustrates a method for adjusting background edge pixels in accordance with another embodiment of the present disclosure.

A method 700 as shown in FIG. 7 describes using both the comparisons of the maximum luminance value in the predefined neighborhood pixel window, and the luminance value of the current pixel with their respective predetermined thresholds in order to determine whether the edge pixels in the background plane are assigned the maximum luminance value in the predefined neighborhood pixel window, or retains the original luminance value of the current pixel.

FIG. 7 illustrates the method for adjusting the background edge pixels in accordance with another embodiment of the present disclosure. The method 700 begins at procedure 702. At procedure 704, a controller determines whether the following conditions are satisfied: a) chrominance value of channel A of the current pixel is close to neutral value or within a predetermined range including the neutral value, b) chrominance value of channel B of the current pixel is close to neutral value or within a predetermined range including the neutral value, c) maximum luminance value in the predefined neighborhood pixel window is greater than or equal to a predetermined threshold, and d) luminance value of the current pixel is greater than or equal to a predetermined threshold.

The conditions a, and b in the procedure 704 are similar to the conditions a and b in the procedure 604 described in detail above, and hence will not be described here.

In one embodiment, in order to determine whether the maximum luminance value in the predefined neighborhood pixel window is greater than or equal to a predetermined threshold, the controller uses the following formula:

$$lum\_max >= MaxL2$$

Where:

lum_max is maximum luminance value in the predefined neighborhood pixel window; and MaxL2 is a predetermined threshold of a maximum luminance value for switching luminance to maximum luminance value in the background plane. The value of MaxL2 may be equal to 240 or 220.

In one embodiment, in order to determine whether the luminance value of the current pixel is greater than or equal to a predetermined threshold, the controller uses the following formula:

$$lum >= HighL1$$

Where:

lum is luminance value of the current pixel of interest; and

HighL1 is a predetermined threshold of a luminance value for switching luminance to maximum luminance value in the background plane. The value of HighL1 may be equal to 150 or 200.

In one embodiment, when the value of MaxL2 is 240, the value of HighL1 is 150. In another embodiment, when the value of MaxL2 is 220, the value of HighL1 is 200. It is contemplated that according to the present disclosure more conditions may be added to make sure that background suppression takes place around the edges when the maximum luminance is very high and the luminance value of the current pixel is also high enough.

Next, at procedure 706, the controller assigns a) the maximum luminance value in the predefined neighborhood pixel window to the output luminance value of the background plane, b) a neutral value to the output chrominance value of channel A of the background plane and c) a neutral value to the output chrominance value of channel B of the background plane, if the conditions at procedure 704 are satisfied. As noted above, the neutral value is a midpoint of a range of color intensity values (e.g., ranging from 0-255), and is equal to 128. If not, in procedure 708, the controller assigns a) the luminance value of the current pixel to the output luminance value of the background plane, b) the chrominance value of channel A of the current pixel to the output chrominance value of channel A of the background plane and c) the chrominance value of channel B of the current pixel to the output chrominance value of channel B of the background plane The method 700 ends at procedure 710.

In other words, if the conditions at procedure 704 are satisfied, then the controller suppresses the background around the edges in the digital image. That is, the maximum luminance value in the predefined neighborhood pixel window is assigned to the output luminance value of the background plane. Otherwise, the background is not suppressed around the edges in the digital image. That is, the current pixel retains its original luminance and chrominance values.

It is to be contemplated that more conditions (e.g., for comparing the maximum luminance value in the predefined neighborhood pixel window and the luminance value of the current pixel with their respective predetermined thresholds) may be added depending on the usage and/or the customer requirements to make sure that background suppression takes place around the edges, when the maximum is very high and the luminance value of the current pixel is also high enough.

In one embodiment, the predetermined thresholds (e.g., MaxL1, MaxL2, and HighL1) may be determined based on background values of the scanned document. In one embodiment, the background values of the scanned documents are determined using existing background detection algorithms, such as described in U.S. Pat. Nos. 6,198,845; 6,674,899; and 7,058,222, herein incorporated by reference in their entirety. These predetermined thresholds (e.g., MaxL1, MaxL2, and HighL1) determined based on background values of the scanned documents may then used to modify the background planes.

Figure 8A:
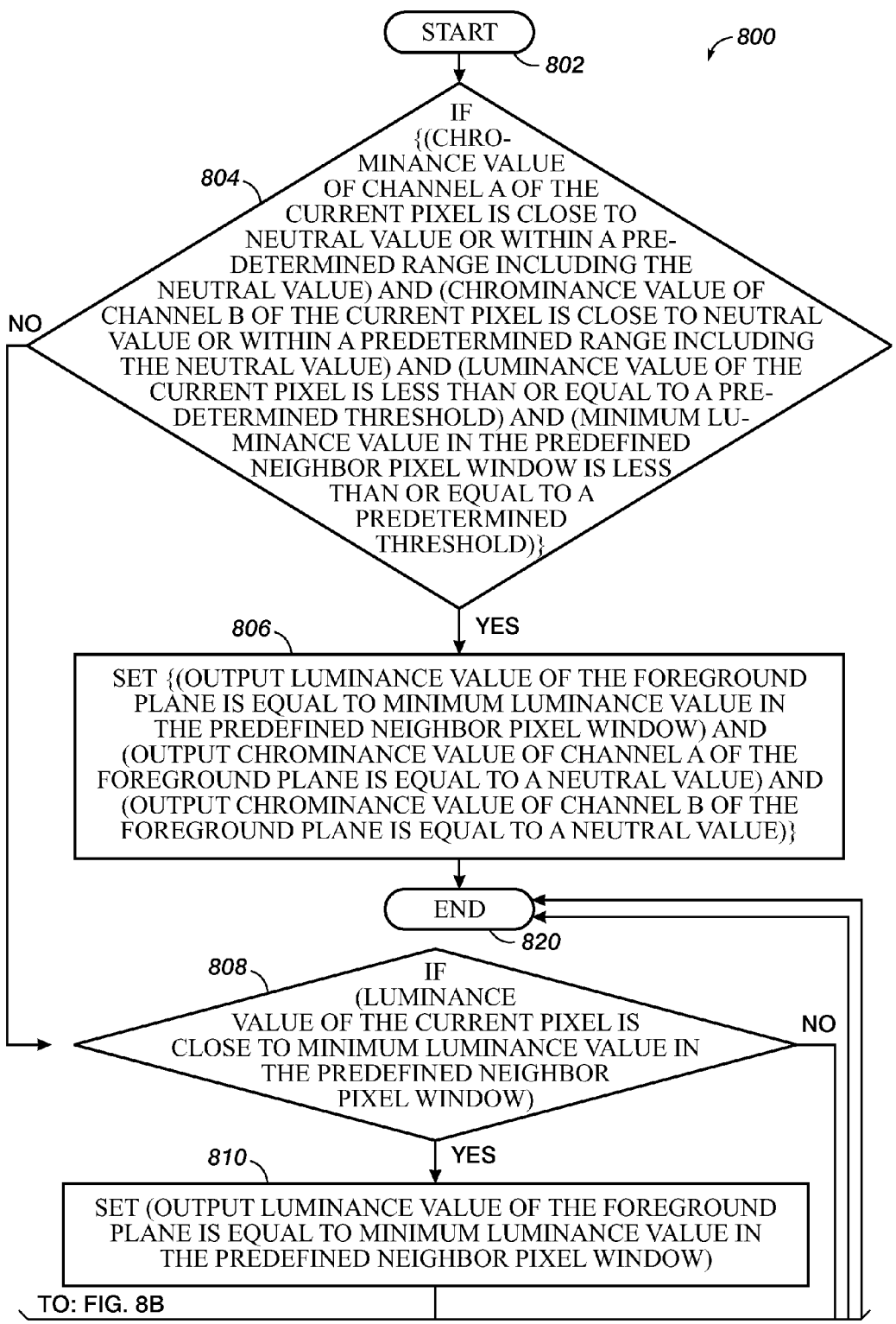
FIGS. 8A and 8B illustrates a method for adjusting foreground edge pixels in accordance with an embodiment of the present disclosure.
Figure 8B:
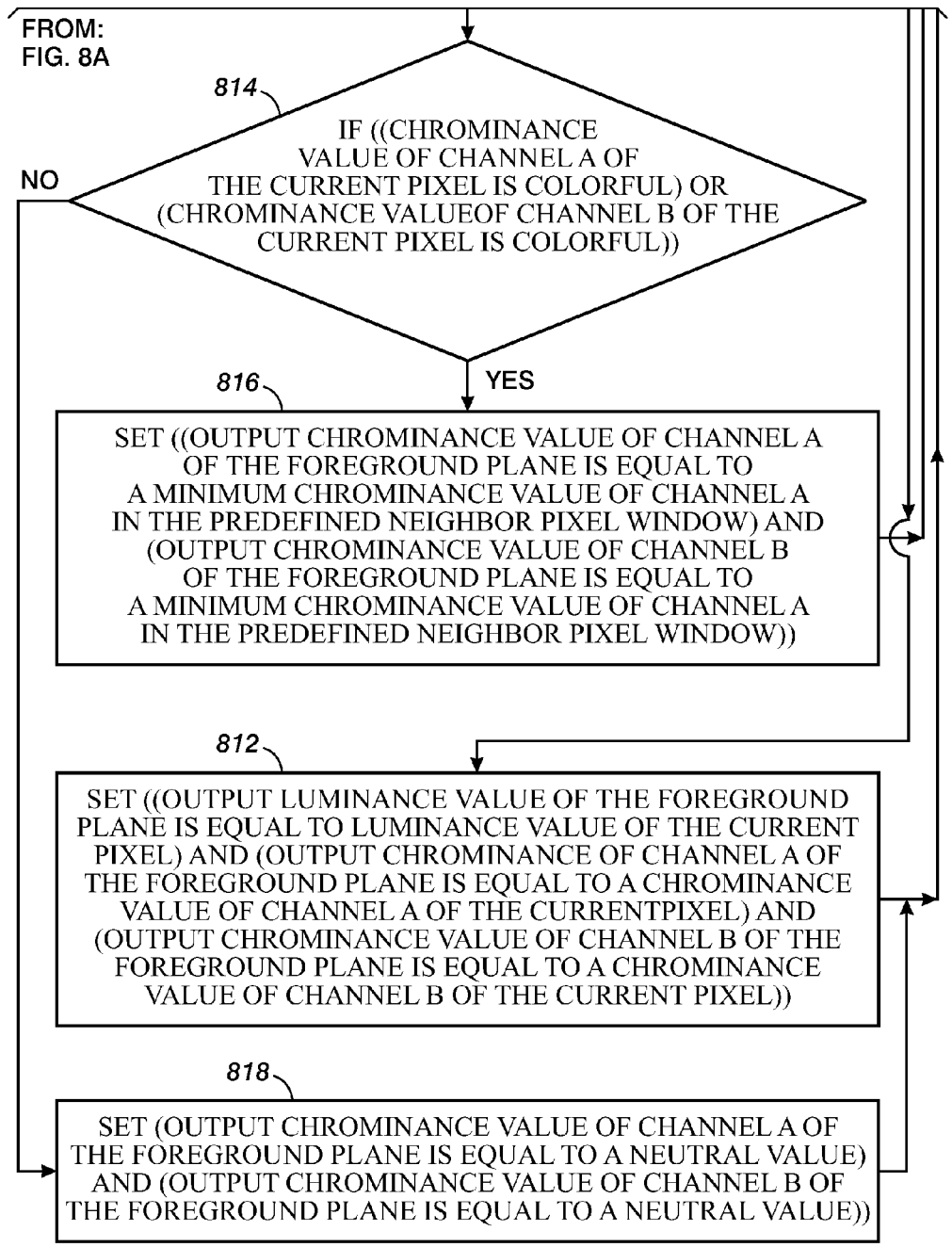

The methods 600 and 700 for adjusting the background edge pixels are used to perform background suppression. As shown in FIGS. 8A and 8B, a method 800 illustrates a method for adjusting the foreground edge pixels in accordance with an embodiment of the present disclosure. The method 800 is used to add contrast conditionally to the foreground plane. As noted above, the foreground plane usually holds the color of the corresponding text and/or line art. The method 800 makes sure that the text in the foreground plane will be as close to black color as possible, if the color of the text is black.

The method 800 begins at procedure 802. At procedure 804, a controller determines whether the following conditions are satisfied: a) chrominance value of channel A of the current pixel is close to neutral value or within a predetermined range including the neutral value, b) chrominance value of channel B of the current pixel is close to neutral value or within a predetermined range including the neutral value, c) minimum luminance value in the predefined neighborhood pixel window is less than or equal to a predetermined threshold, and d) luminance value of the current pixel is less than or equal to a predetermined threshold.

The conditions a, and b in the procedure 804 are similar to the conditions a and b in the procedures 604 and 704 described in detail above, and hence will not be described here.

As noted above, the dependent Min-Max Module 60 determines the minimum luminance value in the predefined neighborhood pixel window. The dependent Min-Max Module 60 examines the predefined neighborhood pixel window centered on the pixel of interest 80 (as shown in FIG. 5) to find the minimum luminance value in the predefined neighborhood pixel window.

In one embodiment, in order to determine whether the luminance value of the current pixel is less than or equal to a predetermined threshold, the controller uses the following formula:

$$lum<=LowL1$$

Where:
lum is luminance value of the current pixel of interest; and
LowL1 is a predetermined threshold of a luminance value to measure how close the luminance value is to black for switching luminance to minimum luminance value in the foreground plane. The value of LowL1 may be equal to 100.

In one embodiment, in order to determine whether the minimum luminance value in the predefined neighborhood pixel window is less than or equal to a predetermined threshold, the controller uses the following formula:

$$lum\_min<=MinL1$$

Where:
lum_min is the minimum luminance value in the predefined neighborhood pixel window; and
MinL1 is a predetermined threshold of a minimum luminance value to measure how close the minimum luminance value is to black for switching luminance to minimum luminance value in the foreground plane. The value of MinL1 may be equal to 80.

Next, at procedure 806, the controller assigns a) the minimum luminance value in the predefined neighborhood pixel window to the output luminance value of the foreground plane, b) a neutral value to the output chrominance value of channel A of the foreground plane and c) a neutral value to the output chrominance value of channel B of the foreground plane, if the conditions at procedure 804 are satisfied. The neutral value is a midpoint of a range of color intensity values (e.g., ranging from 0-255), and is equal to 128. If not, in procedure 808, the controller determines whether the luminance value of the current pixel is approximately equal to minimum luminance value in the predefined neighborhood pixel window.

In one embodiment, in order to determine whether the luminance value of the current pixel is approximately equal to minimum luminance value in the predefined neighborhood pixel window, the controller uses the following formula:

$$lum-lum\_min<=MinDiffL$$

Where:
lum is luminance value of the current pixel of interest;
lum_min is the minimum luminance value in the predefined neighborhood pixel window; and
MinDiffL is a predetermined threshold to measure how close the luminance value of the current pixel is to the minimum luminance value for switching the luminance to minimum luminance value in the foreground plane. The value of MinDiffL may be equal to 5.

Next, at procedure 810, the controller assigns the minimum luminance value in the predefined neighborhood pixel window to the output luminance value of the foreground plane, if the luminance value of the current pixel is approximately equal to minimum luminance value in the predefined neighborhood pixel window. If not, at procedure 812, the controller assigns a) the luminance value of the current pixel to the output luminance value of the foreground plane, b) the chrominance value of channel A of the current pixel to the output chrominance value of channel A of the foreground plane and c) the chrominance value of channel B of the current pixel to the output chrominance value of channel B of the foreground plane.

Next, at procedure 814, the controller determines whether any one of the following conditions is satisfied: a) chrominance value of channel A of the current pixel is colorful, or b) chrominance value of channel B of the current pixel is colorful.

In one embodiment, in order to determine whether the chrominance value of channel A of the current pixel is colorful, the controller uses the following formula:

$$absolute(chrom\_a-128)>=ColorC$$

Where:
chrom_a is a chrominance value of channel A of the current pixel of interest;
128 is a neutral value, wherein the neutral value is a midpoint of a range of color intensity values (e.g., ranging from 0-255); and ColorC is a predetermined threshold to measure how far the chrominance value of channel A of the current pixel of interest is from the neutral value. The value of ColorC may range from 5 to 10.

In other words, the controller determines the difference between the chrominance value of channel A of the current pixel and a neutral value (e.g., "128"). The controller then determines the absolute value of the difference calculated. The controller then determines whether the absolute value of the calculated difference is greater than or equal to a constant, ColorC. Thus, determining how colorful a pixel is.

In one embodiment, in order to determine whether the chrominance value of channel B of the current pixel is colorful, the controller uses the following formula:

$$\text{absolute}(\text{chrom}\_b-128) >= \text{ColorC}$$

Where:

chrom_b is a chrominance value of channel B of the current pixel of interest;

128 is a neutral value, wherein the neutral value is a midpoint of a range of color intensity values (e.g., ranging from 0-255); and ColorC is a predetermined threshold to measure how far the chrominance value of channel B of the current pixel of interest is from the neutral value. The value of ColorC may range from 5 to 10.

In other words, the controller determines the difference between the chrominance value of channel B of the current pixel and a neutral value (e.g., "128"). The controller then determines the absolute value of the difference calculated. The controller then determines whether the absolute value of the calculated difference is greater than or equal to a constant, ColorC. Thus, determining how colorful a pixel is.

At procedure 816, the controller assigns a) the minimum chrominance value of channel A in the predefined neighborhood pixel window to the output chrominance value of channel A of the foreground plane, and b) the minimum chrominance value of channel B in the predefined neighborhood pixel window to the output chrominance value of channel B of the foreground plane, if any one of the conditions at procedure 814 are satisfied. If not, at procedure 818, the controller assigns a) a neutral value to the output chrominance value of channel A of the foreground plane, and b) a neutral value to the output chrominance value of channel B of the foreground plane. As noted above, the neutral value is a midpoint of a range of color intensity values (e.g., ranging from 0-255), and is equal to 128.

Thus, at procedures 814-818 of the method 800, the controller determines whether the chrominance values of the current pixel are colorful. The controller, based on this determination, assigns the minimum chrominance values in the predefined neighborhood pixel window to the output chrominance values of the foreground plane, if the chrominance values of the current pixel are colorful. If not, the controller assigns a neutral value to the output chrominance values of the foreground plane. The method 800 ends, at procedure 820.

Thus, assigning the minimum luminance value in the predefined neighborhood pixel window to the output luminance value of the foreground plane will make the edge pixels in the foreground plane as dark as possible. Also, assigning the maximum luminance value in the predefined neighborhood pixel window to the output luminance value of the background plane will make the edge pixels in the background plane lighter rather than darker as is the case for the edge pixels in the foreground plane.

It is contemplated that the parameters used by the controller of the present disclosure (e.g., NeutralC, MaxL1, MaxL2, HighL1, LowL1, MinL1, ColorC) may remain constant for a particular image or a particular simulation. These parameters will not be changed dynamically for a particular image or a particular simulation. These parameters, however, may be changed from image to image, customer to customer, or product to product based on their usage, image characteristics such as the image background and image offset and/or customer preference. The image characteristics of the scanned documents such as the image background values of the scanned documents and image offset values of the scanned documents are determined using existing background detection algorithms, such as described in U.S. Pat. Nos. 6,198,845; 6,674,899; and 7,058,222, herein incorporated by reference in their entirety.

In one embodiment, the predetermined thresholds (e.g., LowL1, and MinL1) may be determined based on offset values of the scanned document. In one embodiment, the offset values of the scanned documents are determined using existing background detection algorithms, such as described in U.S. Pat. Nos. 6,198,845; 6,674,899; and 7,058,222, herein incorporated by reference in their entirety. These predetermined thresholds (e.g., LowL1, and MinL1) determined based on offset values of the scanned documents may then used to modify the foreground planes.

Figure 9:
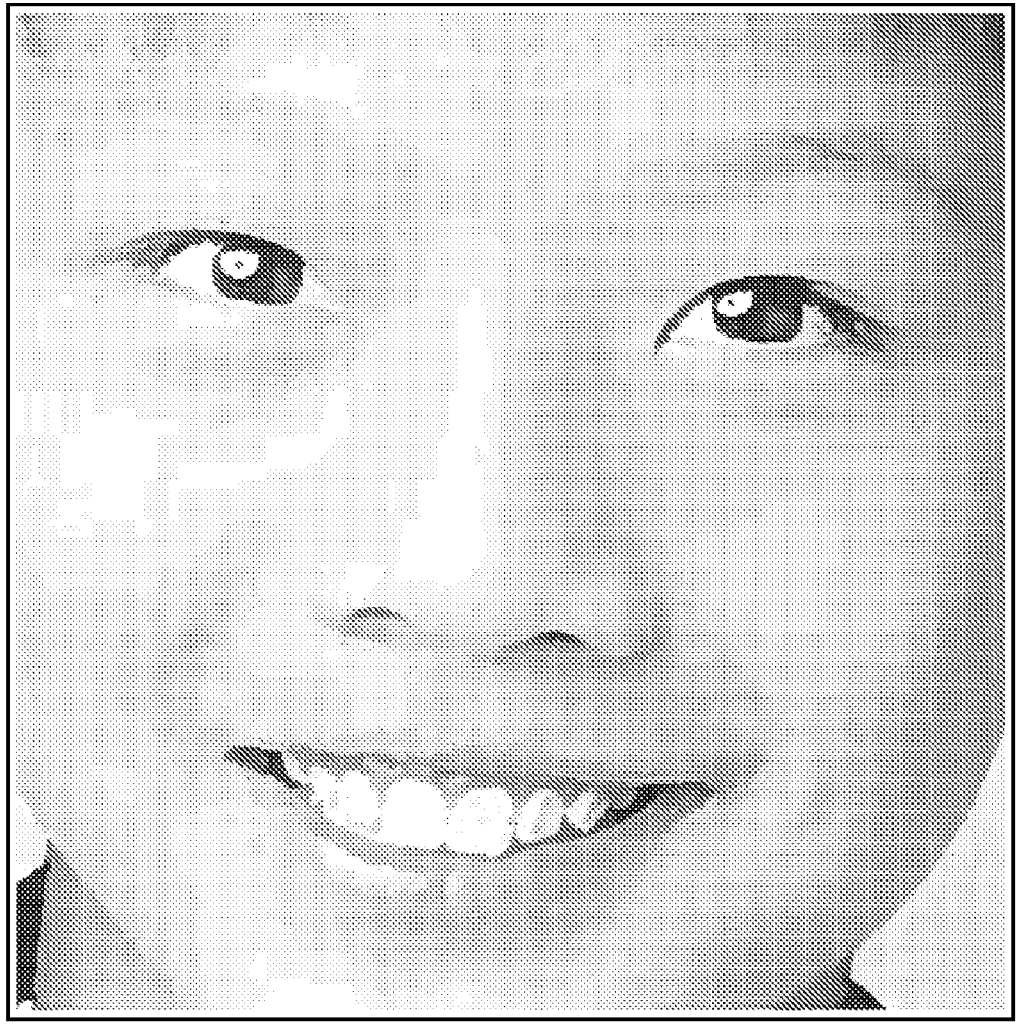
FIG. 9 illustrates a digital image output by a prior art three layer segmentor used for MRC representation that pushes the edges in foreground and background planes to minimum and maximum values of the current pixel, wherein the digital image includes ringing artifacts around edges.

FIG. 9 illustrates a digital image output by a prior art three layer segmentor used for MRC representation that pushes the edges in foreground and background layers to minimum and maximum values of the current pixel. As shown in FIG. 9, the digital image includes ringing artifacts around edges. For example, the ringing artifacts can be clearly seen around the forehead, nose and teeth of the person in the digital image.

Figure 10:
FIG. 10 illustrates a digital image output in accordance with an embodiment of the present disclosure.

FIG. 10 illustrates a digital image output in accordance with an embodiment of the present disclosure. The ringing artifacts around the forehead, nose and teeth of the person in the image are removed by using the method proposed in the present disclosure. As can be seen from FIG. 10, the image quality of the digital image output generated in accordance with an embodiment of the present disclosure is improved.

Figure 11:
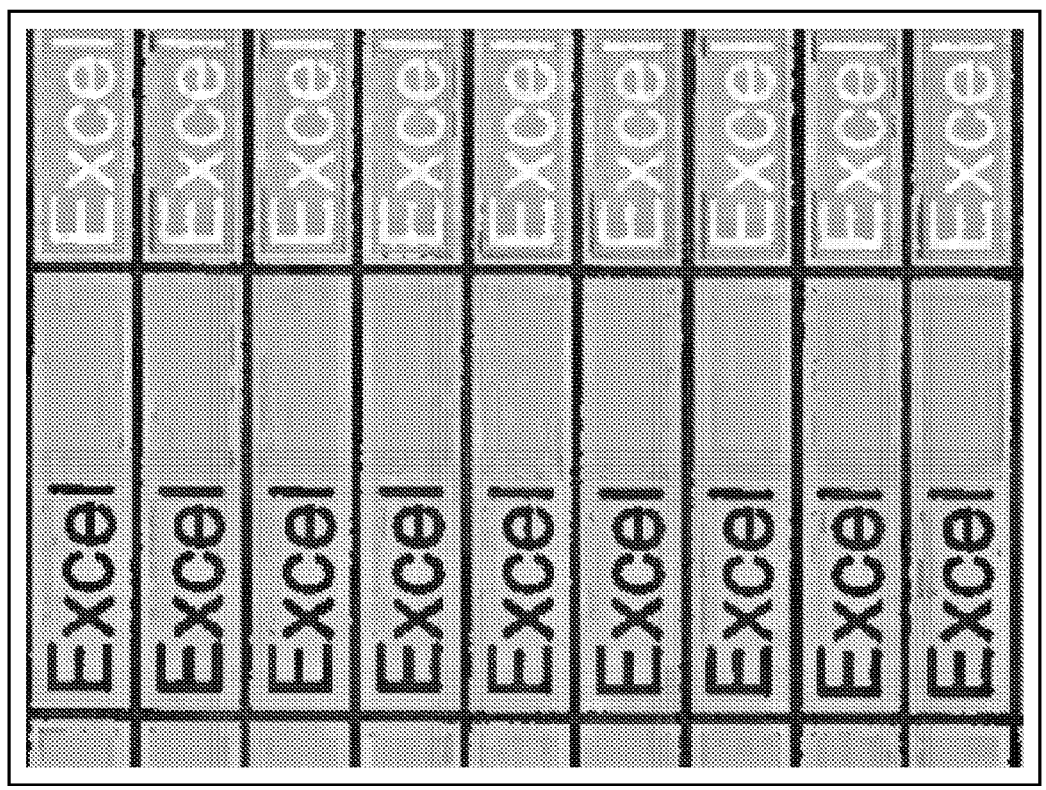
FIG. 11 illustrates a digital image output by a prior art three layer segmentor used for MRC representation that pushes the edges in foreground and background planes to minimum and maximum values of the current pixel, wherein the digital image includes ringing artifacts around edges.

FIG. 11 illustrates a digital image output by a prior art three layer segmentor used for MRC representation that pushes the edges in foreground and background layers to minimum and maximum values of the current pixel. As shown in FIG. 11, the digital image includes ringing artifacts around edges. For example, the ringing artifacts are in the form of artificial lines in the digital image.

Figure 12:
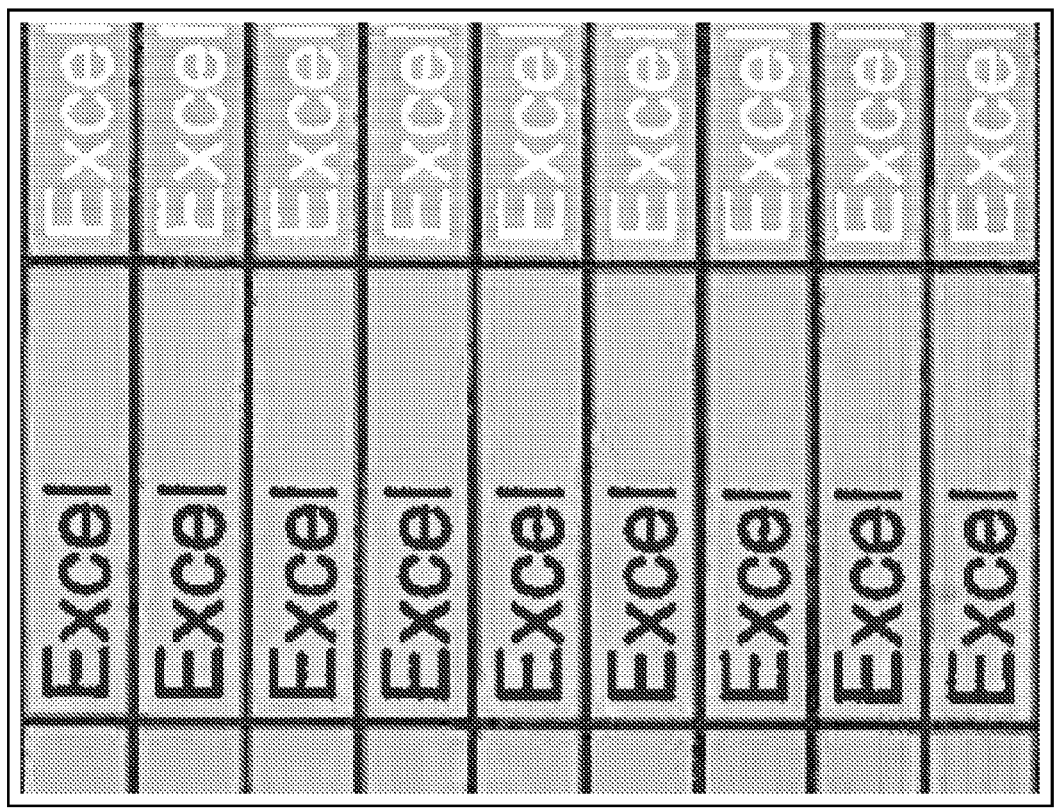
FIG. 12 illustrates a digital image output in accordance with an embodiment of the present disclosure.
Figure 13:
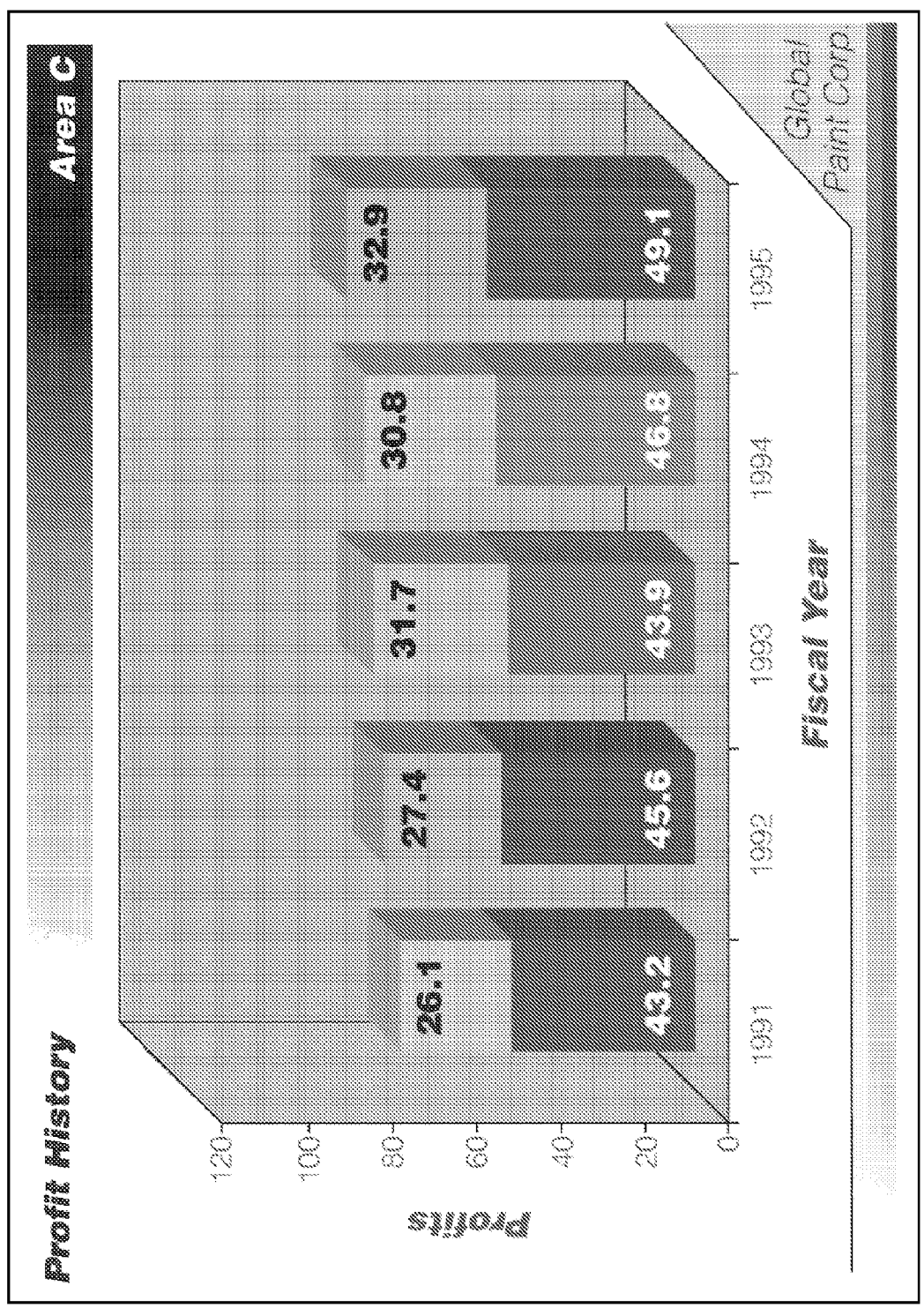
FIGS. 13 and 14 show a digital image and an edge profile that is created from the digital image, respectively.
Figure 14:
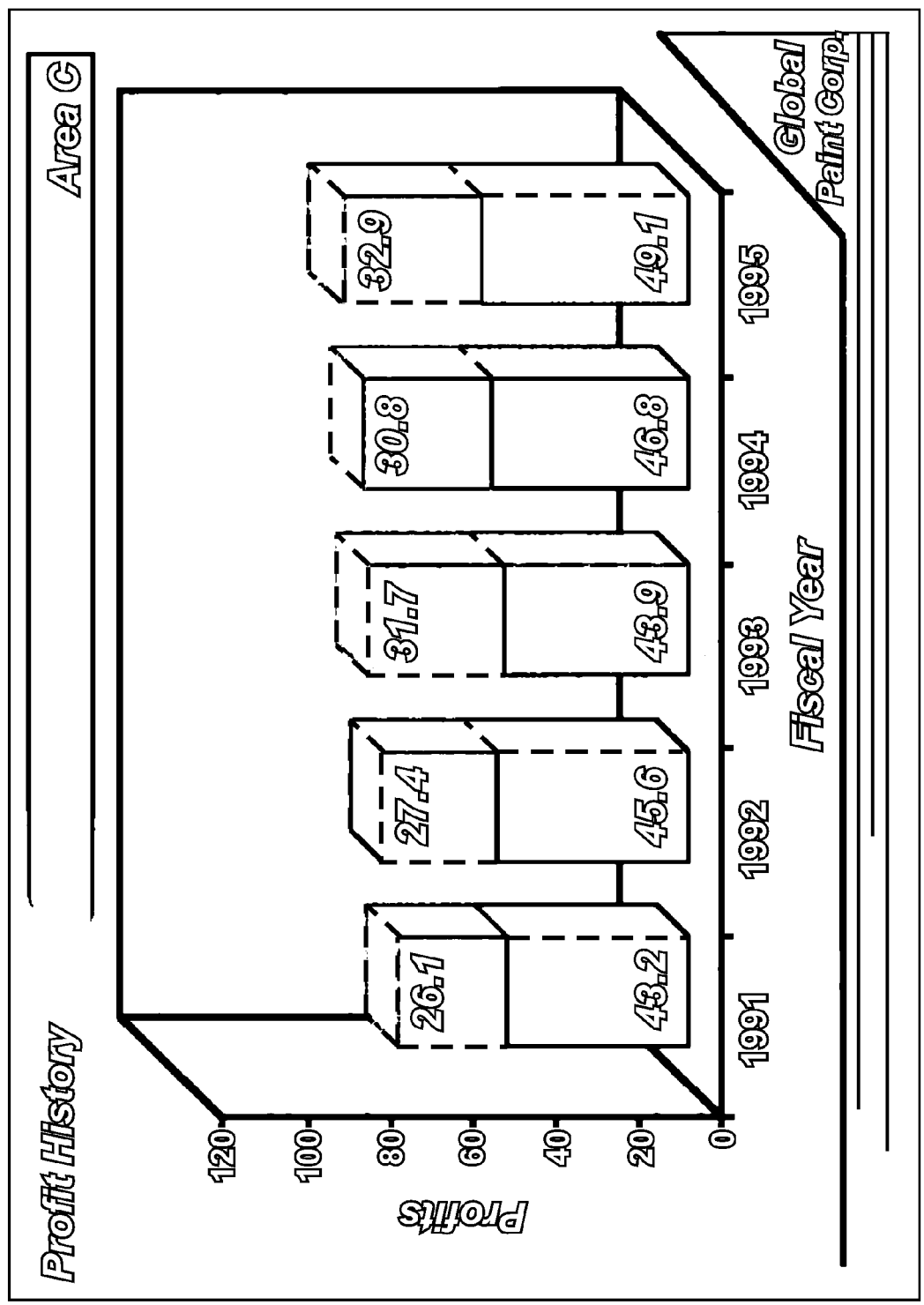

FIG. 12 illustrates a digital image output in accordance with an embodiment of the present disclosure. The ringing artifacts in the form of artificial lines are removed by using the method proposed in the present disclosure. As can be seen from FIG. 12, the image quality of the digital image output generated in accordance with an embodiment of the present disclosure is improved.

The controller disclosed herein may be dedicated hardware like ASICs or FPGAs, software, or a combination of dedicated hardware and software. For the different applications of the embodiments disclosed herein, the programming and/or configuration may vary. The controller may be incorporated, for example, into a dynamic threshold module of a scan segmentation module.

The present disclosure, thus, provides a method and a system for comparing the minimum value of the specified characteristic received from the min-max module to a value of the specified characteristic of the current pixel, in case of the edge pixels in the foreground plane or comparing the maximum value of the specified characteristic received from the min-max module to a value of the specified characteristic of the current pixel, and dynamically assigning an appropriate value (e.g., minimum value of the specified characteristic received from the min-max module for the edge pixels in the foreground plane or maximum value of the specified characteristic received from the min-max module for the edge pixels in the background plane, or a value of the specified characteristic of the current pixel) to the edge pixels in the foreground and background planes.

The present disclosure provides another level of flexibility to tune the image quality for the segmented three-layer MRC. The present disclosure shows reduced level of switching artifact while retaining higher contrast in true high transition areas.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for improving image quality of edge pixels in a background plane, when separating an image signal into a set of image planes, the method comprising:
   searching, via a min-max module, for a minimum value and a maximum value of a specified characteristic within at least one predefined neighborhood pixel window centered on a current pixel in the image signal, wherein the predefined neighborhood pixel window comprises the edge pixels; and
   conditionally switching, via a dynamic threshold module, the edge pixels to either the respective minimum value of the specified characteristic or the maximum value of the specified characteristic received from the min-max module, or to a value of the specified characteristic of the current pixel, based on a predetermined criteria,
   wherein the predetermined criteria for conditionally switching the edge pixels comprises determining whether a maximum luminance value in the predefined neighborhood pixel window is greater than or equal to a predetermined threshold.

2. A method according to claim 1, wherein the predetermined criteria for conditionally switching the edge pixels further comprises determining whether chrominance values of the current pixel is equal to a neutral value or within a predetermined range including the neutral value, where the neutral value is a midpoint of a range of color intensity values.

3. A method according to claim 2, wherein the predetermined criteria for conditionally switching the edge pixels further comprises determining whether a luminance value of the current pixel is greater than or equal to a predetermined threshold.

4. A method according to claim 3, wherein the edge pixels in the background plane retain an original value of the specified characteristic of the current pixel, when the predetermined criteria are not satisfied.

5. A method according to claim 1, wherein the specified characteristic within at least one predefined neighborhood pixel window centered on the current pixel is a luminance value of a luminance channel.

6. A method according to claim 3, wherein the predetermined threshold is determined using background values of a scanned document.

7. A method for improving image quality of edge pixels in a foreground plane, when separating an image signal into a set of image planes, the method comprising:
   searching, via a min-max module, for a minimum value and a maximum value of a specified characteristic within at least one predefined neighborhood pixel window centered on a current pixel in the image signal, wherein the predefined neighborhood pixel window comprises the edge pixels; and
   conditionally switching, via a dynamic threshold module, the edge pixels to either the respective minimum value of the specified characteristic or the maximum value of the specified characteristic received from the min-max module, or to a value of the specified characteristic of the current pixel, based on a predetermined criteria,
   wherein the predetermined criteria for conditionally switching the edge pixels comprises determining whether
   a) a minimum luminance value in the predefined neighborhood pixel window is less than or equal to a predetermined threshold; and
   b) a luminance value of the current pixel is less than or equal to a predetermined threshold.

8. A method according to claim 7, wherein the predetermined criteria further comprises determining whether chrominance values of the current pixel is equal to a neutral value or within a predetermined range including the neutral value, where the neutral value is a midpoint of a range of color intensity values.

9. A method according to claim 8, wherein the edge pixels in the foreground plane retain an original value of the specified characteristic of the current pixel, when the predetermined criteria are not satisfied.

10. A method according to claim 7, wherein the specified characteristic within at least one predefined neighborhood pixel window centered on the current pixel is a luminance value of a luminance channel.

11. A method according to claim 7, wherein the predetermined threshold is determined using offset values of a scanned document.

12. A system for improving image quality of edge pixels in a background plane, when separating an image signal into a set of image planes, the system comprising:
   a min-max module configured to search for a minimum value and a maximum value of a specified characteristic within at least one predefined neighborhood pixel window centered on a current pixel in the image signal, wherein the predefined neighborhood pixel window comprises the edge pixels; and
   a dynamic threshold module configured to conditionally switch, based on a predetermined criteria, the edge pixels to either the respective minimum value of the specified characteristic or the maximum value of the specified characteristic received from the min-max module, or to a value of the specified characteristic of the current pixel,
   wherein the predetermined criteria for conditionally switching the edge pixels comprises determining whether a maximum luminance value in the predefined neighborhood pixel window is greater than or equal to a predetermined threshold.

13. A system according to claim 12, wherein the predetermined criteria for conditionally switching the edge pixels further comprising determining whether chrominance values of the current pixel is equal to a neutral value or within a predetermined range including the neutral value, where the neutral value is a midpoint of a range of color intensity values.

14. A system according to claim 13, wherein the predetermined criteria for conditionally switching the edge pixels further comprising determining whether a luminance value of the current pixel is greater than or equal to a predetermined threshold.

15. A system according to claim 14, wherein the edge pixels in the background plane retain an original value of the specified characteristic of the current pixel, when the predetermined criteria are not satisfied.

16. A system according to claim 12, wherein the specified characteristic within at least one predefined neighborhood pixel window centered on the current pixel is a luminance value of a luminance channel.

17. A system according to claim 14, wherein the predetermined threshold is determined using background values of a scanned document.

18. A system for improving image quality of edge pixels in a foreground plane, when separating an image signal into a set of image planes, the system comprising:
   a min-max module configured to search for a minimum value and a maximum value of a specified characteristic within at least one predefined neighborhood pixel window centered on a current pixel in the image signal, wherein the predefined neighborhood pixel window comprises the edge pixels; and
   a dynamic threshold module configured to conditionally switch, based on a predetermined criteria, the edge pixels to either the respective minimum value of the specified characteristic or the maximum value of the specified characteristic received from the min-max module, or to a value of the specified characteristic of the current pixel,
   wherein the predetermined criteria for conditionally switching the edge pixels in a background plane further comprising determining whether
   a) a maximum luminance value in the predefined neighborhood pixel window is greater than or equal to a predetermined threshold; and
   b) a luminance value of the current pixel is greater than or equal to a predetermined threshold.

19. A system according to claim 18, wherein the predetermined criteria for conditionally switching the edge pixels further comprising determining whether chrominance values of the current pixel is equal to a neutral value or within a predetermined range including the neutral value, where the neutral value is a midpoint of a range of color intensity values.

20. A system according to claim 19, wherein the edge pixels in the foreground plane retain an original value of the specified characteristic of the current pixel, when the predetermined criteria are not satisfied.

21. A system according to claim 18, wherein the specified characteristic within at least one predefined neighborhood pixel window centered on the current pixel is a luminance value of a luminance channel.

22. A system according to claim 18, wherein the predetermined threshold is determined using offset values of a scanned document.

* * * * *